United States Patent
Seymour

[11] Patent Number: 5,833,265
[45] Date of Patent: Nov. 10, 1998

[54] AIRBAG WITH EXCURSION RESTRICTORS

[75] Inventor: Brian T. Seymour, Bloomfield, Mich.

[73] Assignee: Takata, Inc., Auburn Hills, Mich.

[21] Appl. No.: 804,203

[22] Filed: Feb. 21, 1997

[51] Int. Cl.⁶ .................................................. B60R 21/16
[52] U.S. Cl. ..................................... 280/743.1; 280/743.2
[58] Field of Search .............................. 280/743.1, 743.2, 280/730.1, 731

[56] References Cited

U.S. PATENT DOCUMENTS

| | | | |
|---|---|---|---|
| 3,614,127 | 10/1971 | Glance | 280/729 |
| 4,842,300 | 6/1989 | Ziomek et al. | 280/732 |
| 4,941,678 | 7/1990 | Lauritzen et al. | 280/732 |
| 4,988,119 | 1/1991 | Hartmeyer | 280/728.2 |
| 5,018,761 | 5/1991 | Henseler | 280/730.1 |
| 5,018,762 | 5/1991 | Suzuki et al. | 280/731 |
| 5,044,663 | 9/1991 | Seizert | 280/730.1 |
| 5,094,477 | 3/1992 | Togawa | 280/728.2 |
| 5,246,250 | 9/1993 | Wolanin et al. | 280/739 |
| 5,249,824 | 10/1993 | Swann et al. | 280/729 |
| 5,253,892 | 10/1993 | Satoh | 280/731 |
| 5,275,435 | 1/1994 | Fischer | 280/743.1 |
| 5,306,043 | 4/1994 | Mihm et al. | 280/732 |
| 5,359,273 | 10/1994 | Onishi et al. | 280/743.1 |
| 5,362,101 | 11/1994 | Sugiura et al. | 280/743.2 |
| 5,378,019 | 1/1995 | Smith et al. | 280/743.2 |
| 5,487,560 | 1/1996 | Emambakhsh | 280/740 |

Primary Examiner—Kenneth R. Rice
Attorney, Agent, or Firm—Harness, Dickey & Pierce P.L.C.

[57] ABSTRACT

A vehicle restraint system having an inflator for providing inflation gas and an airbag. The airbag having excursion restrictors made of localized adhesive deposited between and joining a front and a rear member of the airbag. The excursion restrictors retain portions of the front and rear members in proximity to one another until a predetermined threshold pressure is obtained. Thereafter, the adhesive of the excursion restrictor fails in a controlled fashion and the airbag is allowed to fully inflate.

12 Claims, 2 Drawing Sheets

AIRBAG WITH EXCURSION RESTRICTORS

FIELD OF THE INVENTION

This invention relates to an airbag restraint system, and more particularly, to an airbag having excursion restrictors for controlling the shape of the airbag during deployment.

BACKGROUND OF THE INVENTION

Airbag restraint systems for automotive vehicles have been used for many years to prevent or reduce occupant injuries in the event of a serious collision. These systems typically include an airbag which momentarily inflates when a signal is detected from a crash sensor. The airbag is generally made of sheets of nylon or other suitable material which is sewn together along the peripheral edges. The airbag generally includes an inflation opening in one of the sheets through which the gases from an inflator pass thereby inflating the airbag.

Airbags, and particularly driver-side airbags mounted to the steering wheel hub of a vehicle, are often provided with internal suspension belts or tethers to help control the shape of the airbag during deployment. Each tether is attached to an inner surface of the airbag and act to slow the deployment of that portion of the airbag to which it is attached. In the case of a driver-side airbag, tethers are used to modify the shape of the inflated airbag such that a more disc-like shape is obtained as opposed to a more spherical shape which would be formed without the tethers. This disc-type shape during inflation is preferred in some design applications over the spherical shape.

While airbags incorporating tethers are believed to perform satisfactory, the addition of the tethers add complexity and weight, and increase the packaging space required. As an alternative to incorporating tethers in the airbag, it is known to use stitching through the airbag which is designed to fail during inflation. In such systems, the airbag becomes partially inflated until the internal pressure exceeds a predetermined threshold thereby causing the stitches to fail and full inflation of the airbag occurs. While each of these approaches are believed to perform satisfactorily there is an ongoing need for providing design alternatives which can reduce the complexity, weight, and packaging space for airbags in vehicles.

SUMMARY OF THE INVENTION

An airbag restraint system is disclosed as having an airbag including excursion restrictors. The excursion restrictors are used to shape the airbag during deployment while not affecting the final shape of the airbag when fully deployed. Localized adhesive is discreetly positioned between a front member and a rear member which generally form the airbag of the present invention. During a collision, inflation gas from an inflator enters the airbag through an inflation aperture. The inflation gas initially forces the front and rear members apart in portions of the airbag which are not restricted by the excursion restrictors. When the pressure of the inflation gas reaches a predetermined threshold level the portions of the airbag which where restricted by the excursion restrictors are allowed to separate. This is accomplished by the adhesive experiencing a controlled failure mode thereby failing to hold the front and rear member in proximity to one another.

Further features and advantages of the invention will become apparent upon consideration of the following description and the appended claims when taken in connection with the accompanying drawings.

DETAILED DESCRIPTION OF THE PREFERRED EMBODIMENTS

Figure 1:
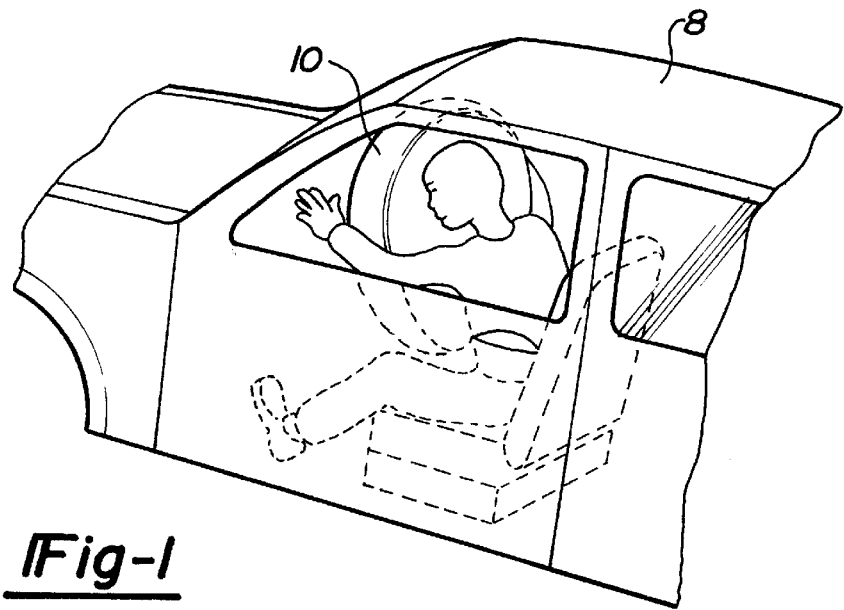
FIG. 1 is a pictorial view of a motor vehicle and occupant with an inflated airbag made in accordance with the teachings of the present invention.

Referring to FIG. 1, there is shown a vehicle 8 incorporating an airbag 10 made in accordance with the present invention. While the preferred embodiments of airbag 10 will be described with reference to a driver-side airbag, it is not intended to be limited to such application. The present invention may equally be incorporated in any seating position in the vehicle to protect the occupant from front, side, or rear impacts where it is beneficial to control the shape of the airbag during deployment.

Airbag 10 is typically incorporated in an airbag module (not shown) which generally includes an inflator and some form of housing, both of which are in widespread use and do not constitute features of the present invention. For reference, a complete airbag module is described in commonly assigned U.S. Pat. No.: 5,556,127, issued on Sep. 17, 1996, entitled "Seat Mounted Side Impact Module"; and U.S. Pat. No. 5,560,642, issued on Oct. 1, 1996, entitled "Driver Air Bag Module Assembly", which are each hereby incorporated by reference.

Figure 2:
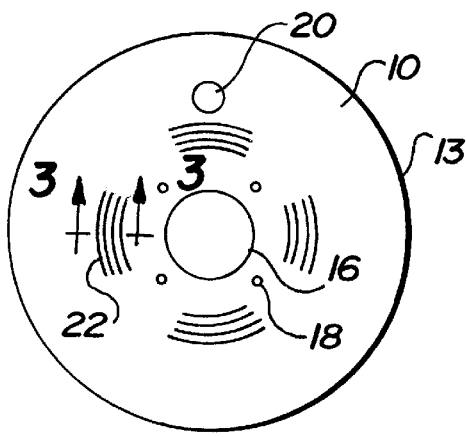
FIG. 2 is a front view of an airbag made in accordance with the first embodiment of the present invention incorporating a pattern of elongated beads of adhesive to provide excursion restriction.
Figure 3:
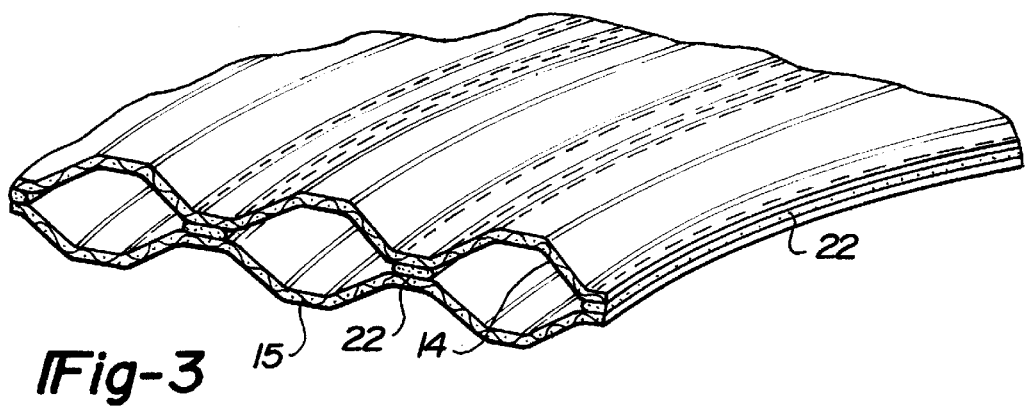
FIG. 3 is a partial cross-sectional view of FIG. 2 taken along line 3—3.

Referring to FIGS. 2 and 3, airbag 10 is shown to be made of a front member 14 and a rear member 15. Members 14 and 15 are generally made of a sheet or cloth which may, for example, be made of woven nylon or polyester yarns. Members 14 and 15 are joined together by sewing or weaving the perimeter edges 13 such that a chamber is formed which can be inflated by inflation gases from the inflator. Rear member 15 incorporates an inflation aperture 16 which is positioned to receive the high pressure inflation gas from the inflator during deployment. Airbag 10 is secured relative to the inflator by way of fasteners (not shown) passing through attachment holes 18 and attached to a housing (not shown). Further, a vent aperture 20 may be provided in airbag 10 to allow the inflation gas to be dispatched after inflation, or porous sheets of material may be used for front member 14 and rear member 15 which allow the gas to be dispatched without a vent aperture 20.

In order to control the shape of airbag 10 during inflation, a plurality of elongated beads of adhesive 22 may be incorporated which prevent front member 14 from immediately separating from rear member 15 during inflation. Beads 22 join front member 14 and rear member 15 in a generally circular pattern as shown in FIG. 2 and are designed to allow front member 14 and rear member 15 to separate when a predetermined threshold pressure is reached. Once member 14 or 15 has separated from beads 22 during inflation, airbag 10 is allowed to achieve its fully inflated condition and shape.

Beads 22 allow member 14 and member 15 to separate by failing in a controlled fashion in one of several modes or by a combination of the several modes. One mode is when the adhesive bond between beads 22 and member 14 or member 15 are overcome by the forces acting to separate member 14 from member 15, the separating force being created by the pressure of the inflation gas entering airbag 10 from the inflator. A second mode is where the adhesive bond between beads 22 and member 14 or 15 is greater than the tensile strength of the adhesive of beads 22 and beads 22 are elongated to the point of failure. Under either of the two failure modes described above, the resulting condition is that member 14 and member 15 are allowed to separate from one another at the predetermined threshold pressure and airbag 10 achieves its fully inflated shape.

The composition and properties of the adhesive used in beads 22 can be varied depending on the threshold pressure and the mode of controlled failure which is desired to achieve an optimum design for the particular application which airbag 10 is to utilize.

While beads 22 have been shown as a generally circular broken pattern, it is to be understood that the beads can vary in length, radial distance from inflation aperture 16, the number of beads, the width of each bead, and the distance between each of the beads if more than one elongated bead of adhesive is utilized. These and other variables not mentioned can be modified in order to optimize the airbag performance depending upon the number and types of inflators used and upon the crash pulse or signature of the vehicle in which the airbag is to be incorporated.

Figure 4:
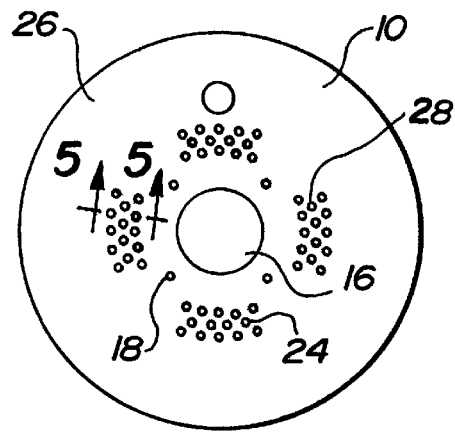
FIG. 4 is a front view, similar to that of FIG. 2, but showing the second embodiment of the present invention incorporating a circular pattern of adhesive dots to provide excursion restriction.
Figure 5:
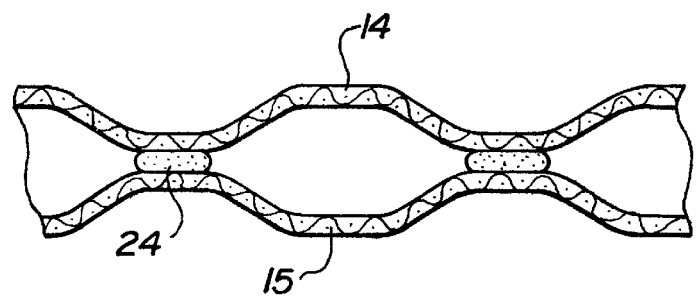
FIG. 5 is a partial cross-sectional view of the airbag of FIG. 4 taken along line 5—5.

With reference now to FIGS. 4 and 5, airbag 10 is shown in the second preferred embodiment made in accordance with the teachings of the present invention. Airbag 10 is again constructed of a front member 14 and a rear member 15 as described above. Further, airbag 10 also includes an inflation aperture 16 and attachment holes 18 as previously described. The excursion restrictor of the second preferred embodiment is achieved by way of discreetly positioned localized adhesive shown as a series of adhesive restrictor dots which are deposited between and join front member 14 and rear member 15.

As shown, restrictor dots 24 are arranged in a generally circular pattern having an increasing radial distance for each series of dots 24. Restrictor dots 24 are made of an adhesive material compatible with the material of members 14 and 15 and provide adhesion between members 14 and 15 thereby retaining members 14 and 15 in proximity to one another until a predetermined pressure threshold is achieved. When the pressure threshold is achieved, adhesive dots 24 may fail in a controlled fashion as previously described relative to the first embodiment. Again, one mode is when the adhesive properties between restrictor dots 24 and member 14 or member 15 are overcome by the forces acting to separate member 14 from member 15. The separating force being created by the pressure of the inflation gas entering airbag 10 from the inflator. A second mode is where the adhesive bond between restrictor dots 24 and member 14 or 15 is greater than the tensile strength of restrictor dots 24 and restrictor dots 24 are elongated to the point of failure. Under either of the failure modes described above, the resulting condition is that member 14 and member 15 are allowed to separate from one another at the predetermined threshold pressure and airbag 10 achieves its fully inflated shape.

The composition and properties of the adhesive used in restrictor dots 24 can be varied depending on the threshold pressure and the mode of controlled failure which is desired to achieve an optimum design for the particular application which airbag 10 is to utilize. In addition to controlling the composition and properties of the adhesive used in restrictor dots 24, variations in the number, size, spacing, and pattern of restrictor dots 24 may be utilized in order to optimize the performance of airbag 10.

The pattern of adhesive restrictor dots 24 shown in FIG. 4 allow airbag 10 to begin inflating a radially outer unrestricted portion 26, this portion being an area which is not restricted from exhibiting initial inflation by the inflation gas from the inflator. Then, as the threshold pressure is achieved in unrestricted portion 26, the restrictor dots 24 begin to reach a controlled failure mode and allow member 14 and member 15 to separate from one another in the more centralized restricted portion 28 which has been restricted by the excursion restrictors from exhibiting initial inflation by the inflation gas. When restrictor dots 24 have all reached a failure mode level, due to the forces created at the threshold pressure, front member 14 and rear member 15 separate and allow airbag 10 to achieve its fully inflated shape. During this time, while restrictor dots 24 are reaching their failure mode, some of the initial pressure exerted on airbag 10 from inflation gas provided from the inflator are vented either through vent aperture 20 or through the porous material of which airbag 10 may be constructed.

Figure 6:
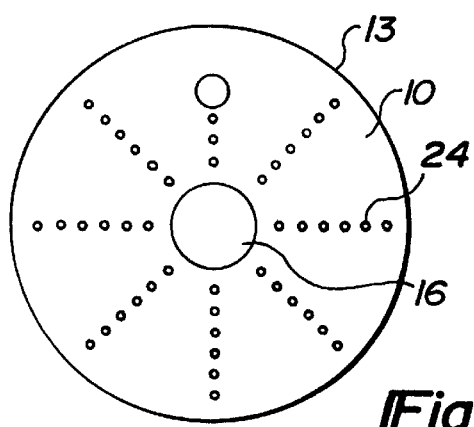
FIG. 6 is a front view, similar to that shown in FIG. 4, but showing a third embodiment of the present invention incorporating an alternate configuration of adhesive dots extending radially to provide excursion restriction.

FIG. 6 shows one of the many variations which may be used within airbag 10 for the pattern of adhesive restrictor dots 24. As shown, the restrictor dots 24 are arranged in a series of radially extending linear patterns emanating from near the inflation aperture 16 toward the perimeter edge 13.

While the above detailed description describes preferred embodiments of the present invention, it should be understood that the present invention is susceptible to modification, variation, and alteration without deviating from the scope and fair meaning of the appended claims.

What is claimed is:

1. A vehicle airbag restraint system comprising:

an inflator for providing inflation gas; and an airbag having an excursion restrictor for controlling the shape of said airbag during deployment of said airbag by said inflation gas from said inflator, said inflation gas passing from said inflator to said airbag by way of a inflation aperture in said airbag which is coordinated with said inflator, said excursion restrictor being a localized adhesive deposited between and joining a front member and a rear member of said airbag, an adhesive bond being created between said adhesive and said front member and said rear member, said excursion restrictor retaining said front member and said rear member in proximity to one another until a predetermined threshold pressure of said inflation gas within said airbag is obtained and thereafter failing to join said front member and said rear member in a controlled manner.

2. The airbag restraint system of claim 1 wherein said adhesive fails in a tensile mode when said adhesive bond between said adhesive and said front member and between said adhesive and said rear member is greater than the tensile strength of said adhesive, said inflation gas forcing said front member and said rear member apart thereby causing the tensile loading upon said adhesive.

3. The airbag restraint system of claim 1 wherein said adhesive fails in a sheering mode when said adhesive bond between said adhesive and said front member and between said adhesive and said rear member is less than the tensile strength of said adhesive, said inflation gas forcing said front member and said rear member apart thereby causing the sheering load upon said adhesive bond between said adhesive and one of said members.

4. The airbag restraint system of claim 1 wherein said excursion restrictor is a plurality of adhesive dots arranged in a predetermined pattern coordinated such that unrestricted portions within said airbag are inflated to said predetermined threshold pressure while unrestricted portions of said airbag, having said adhesive dots, are inflated only after said predetermined threshold pressure is obtained.

5. The airbag restraint system of claim 4 wherein said pattern of adhesive dots is a generally circular series of dots having an axis generally coordinated with said inflation aperture.

6. The airbag restraint system of claim 4 wherein said pattern of adhesive dots is a series of dots extending in a radially extending generally linear fashion substantially from said inflation aperture toward a perimeter edge of said airbag.

7. The airbag restraint system of claim 1 wherein said excursion restrictor is an elongated bead of adhesive arranged in a predetermined pattern coordinated such that unrestricted portions within said airbag are inflated to said predetermined threshold pressure while restricted portions of said airbag, having said bead of adhesive, are inflated only after said predetermined threshold pressure is obtained.

8. The airbag restraint system of claim 7 wherein said bead of adhesive is a generally circular series of beads having an axis generally coordinated with said inflation aperture.

9. The airbag restraint system of claim 1 wherein said excursion restrictor is a series of adhesive beads extending in a radially extending generally linear fashion, said beads extending from said inflation aperture toward a perimeter edge of said airbag.

10. A vehicle airbag restraint system having an airbag and an inflator, the inflator providing inflation gas to the airbag when a signal is received from a sensor positioned on the vehicle which indicates a collision, said airbag comprising:

an airbag having an excursion restrictor for controlling the shape of said airbag during deployment of said airbag by said inflation gas from said inflator, said inflation gas passing from said inflator to said airbag by way of a inflation aperture in said airbag which is coordinated with said inflator, said excursion restrictor being a discreetly positioned localized adhesive deposited between and joining a front member and a rear member of said airbag, adhesive bonds being created between said adhesive and said front member and said rear member, said excursion restrictor retaining said front member and said rear member in proximity to one another until a predetermined threshold pressure of said inflation gas within said airbag is obtained and thereafter failing to join said front member and said rear member in a controlled manner.

11. The airbag of claim 10 wherein said localized adhesive is a series of dots arranged in a predetermined pattern such that restricted portions of said front member and said rear member are retained in proximity to one another while unrestricted portions of said front member and said rear member are allowed to separate from one another prior to said threshold pressure being obtained, said restricted portions of said front member and said rear member being allowed to separate from one another after said threshold pressure is obtained thereby allowing said airbag to achieve a fully inflated condition and shape.

12. The airbag of claim 10 wherein said localized adhesive is a generally continuous bead arranged in a predetermined pattern such that restricted portions of said front member and said rear member are retained in proximity to one another while unrestricted portions of said front member and said rear member are allowed to separate from one another prior to said threshold pressure being obtained, said restricted portions of said front member and said rear member being allowed to separate from one another after said threshold pressure is obtained thereby allowing said airbag to achieve a fully inflated condition and shape.

* * * * *